United States Patent [19]

Miller

[11] 4,152,861
[45] May 8, 1979

[54] ANIMAL TRAP HOLDER

[76] Inventor: Wesley T. Miller, 925 Sheridan, Ypsilanti, Mich. 48197

[21] Appl. No.: 819,253

[22] Filed: Jul. 27, 1977

[51] Int. Cl.² .......................................... A01M 23/26
[52] U.S. Cl. ............................................ 43/88; 43/96; 248/121; 248/156
[58] Field of Search .................... 43/96, 97, 88, 89; 248/156, 121

[56] References Cited

U.S. PATENT DOCUMENTS

| 1,308,630 | 7/1919 | Hatch | 248/156 X |
|---|---|---|---|
| 1,409,924 | 3/1922 | Byrne | 43/96 |
| 2,388,539 | 11/1945 | Hartman | 43/96 |
| 2,720,050 | 10/1955 | Pfeiffer | 43/96 |
| 2,851,823 | 9/1958 | Peterson | 248/156 X |
| 3,601,353 | 8/1971 | Dale | 248/156 |
| 3,747,259 | 7/1973 | Pellowski | 43/96 X |
| 3,974,592 | 8/1976 | Staats | 43/96 |

Primary Examiner—Harold D. Whitehead
Attorney, Agent, or Firm—Beaman & Beaman

[57] ABSTRACT

A holder for animal traps of the Conibear type utilizing resilient fingers mounted upon an elongated body adapted to be supported on a stake. The fingers include recesses wherein the jaws of the trap are received in the recesses to support the trap in a predetermined manner when set, and upon release the holder fingers do not interfere with the trap operation and the trap structure is automatically released from the holder.

10 Claims, 5 Drawing Figures

ANIMAL TRAP HOLDER

BACKGROUND OF THE INVENTION

The invention pertains to the field of holders for animal traps.

For the trapping of fur bearing animals a wide variety of traps have been constructed, most utilizing spring devices for rapidly closing jaw elements upon the trap being released. While traps for some fur bearing animals require baiting, unbaited traps are often utilized which are located within runways, waterways and other passages frequented by animals wherein the animal is snared as it displaces the trap trigger. A most effective trap of the latter type which has been widely recognized as humane and preserving the quality of the pelt is that trap known as the Conibear type as disclosed in U.S. Pat. No. 3,010,245. This type of trap is located within animal passages and runways, and is widely used in the underwater trapping of muskrats, mink, beaver and other water related animals. The Conibear trap includes a pair of wire jaws biased toward a closed condition by spring, and when set, the trap resembles a pair of wire rectangles in side by side relationship with the trigger element extending toward the middle of the rectangles. Upon the trigger being displaced, the wire jaws quickly close to entrap the animal.

The construction of the Conibear trap is such that the trap does not have a base or flat surface upon which it may be readily rested or otherwise positioned. Accordingly, in the past, the trapper must rig his own type of trap support in order to maintain the trap in the location desired. Such supports are usually fabricated from available sticks and twigs, and a chain and anchor are normally utilized to prevent the trap from being carried away.

It is known to support traps upon stakes, such as shown in U.S. Pat. Nos. 1,409,924; 2,338,539 and 3,747,259. However, a stake support for the Conibear type trap which is economical, easy to use and effectively supports the trap without interferring with its operation has not heretofore been available, and the present invention is directed to such a device.

SUMMARY OF THE INVENTION

It is an object of the invention to provide a holder for animal traps of the Conibear type wherein the trap is held in a set position by its jaws and the holder does not interfere with the trap operation.

A further object of the invention is to provide an animal trap holder supported upon a stake wherein resilient fingers engage the jaws of the trap, and upon the trap being sprung the jaws are automatically released from the holder fingers.

An additional object of the invention is to provide a holder for animal traps which is economical to manufacture, dependable in operation, easily used and installed, and does not interfere with the normal functioning of the trap.

In the practice of the invention the holder includes a body adapted to be supported upon a stake or the like. Various types of means for mounting the body upon the stake may be used, and in the described embodiments set screw and resilient clamp arrangements are shown.

A plurality of resilient fingers are mounted upon the body, and such fingers may be formed by wire elements having an inner end affixed to the body and a free end capable of being resiliently displaced relative to the body. At the finger element free ends a recess is defined by bending the elements, and the recess is open to receive the jaw of the trap. The elements are mounted upon the holder in sets of pairs in opposed relationship wherein the open side of the recesses of a pair face in opposite directions, and in the direction of initial trap jaw movement when the trap is sprung. When the trap is set, the trap jaws are aligned with the finger element recesses and the jaws are resiliently maintained within the fingers upon the trap being set and sufficient friction exists between the jaws and the elements to firmly support the trap upon the holder.

When the trap is sprung the initial movement of the trap jaws moves the jaws out of the finger element recesses completely releasing the trap from the holder structure, and the trap is free to fall from the holder. Normally, the trap will be chained to the stake supporting the holder, or a trap spring is inserted over the stake, whereby the trap will be maintained adjacent the stake for retrieval purposes.

The holder structure is of a simple, readily producable configuration and its operation is readily appreciated by those familiar with the animal trapping art.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENTS

Figure 1:
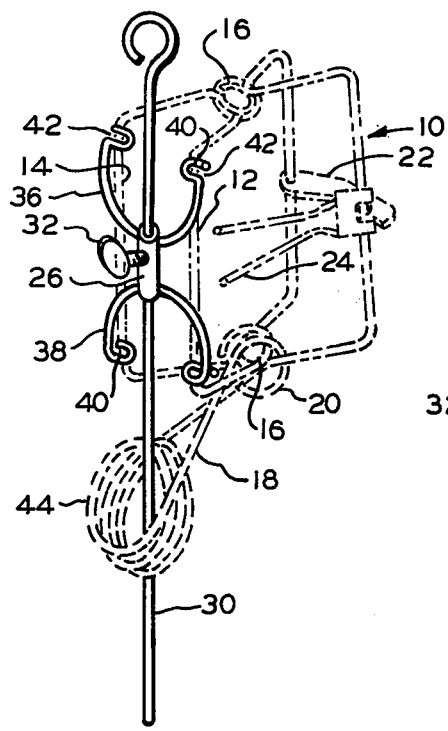
FIG. 1 is a perspective view of an animal trap holder in accord with the invention, a set trap being shown in the holder, the trap being illustrated in dotted lines.

With reference to FIG. 1, a Conibear type trap 10 is illustrated, such trap including wire jaws 12 and 14 pivotally interconnected by pivot structure at 16, and biased toward a closed condition by a coil spring 18 having looped ends 20 disposed about the jaws for pivoting the jaws to a closed condition. The jaws are maintained in the set condition by a retainer 22 which includes a trigger 24 extending into the opening defined by the jaws when set. This type of structure is well-known, and described in U.S. Pat. No. 3,010,245.

Figure 2:
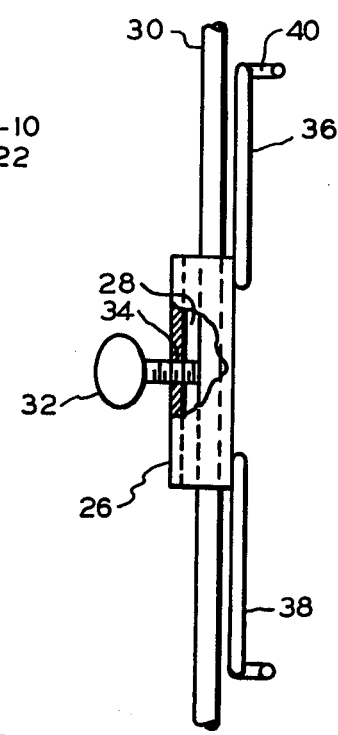
FIG. 2 is a side elevational view of the holder in accord with the invention.
Figure 3:
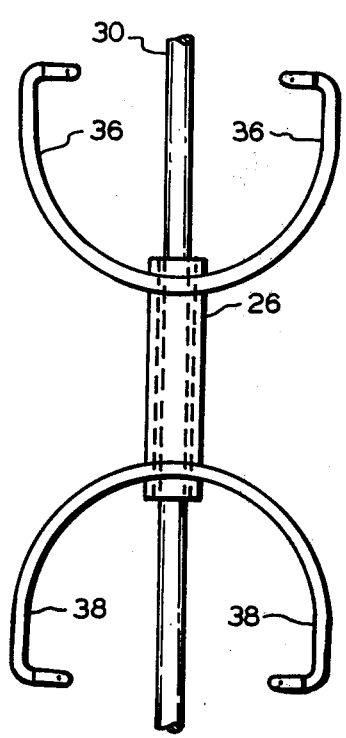
FIG. 3 is a front elevational view as taken from the right of FIG. 2.

The trap holder embodiment illustrated in FIGS. 1–3 includes a cylindrical elongated body 26 having a cylindrical bore 28 adapted to receive the wire stake 30. A thumb set screw 32 is received within threaded opening 34 defined in the wall of the body whereby the inner end of the set screw will engage the stake, and permit the holder to be vertically adjusted on the stake.

The holder includes an upper set of finger elements 36 and a lower set of finger elements 38. The sets of finger elements are formed of wire, and are each of a U-configuration and spot welded at the base of the U to the body 26.

The outer free end of each of the fingers 36 and 38 of each set are bent to define a U-configuration which forms a recess 40 having an open side or throat 42, and the recesses of the fingers of a common set face in opposite directions wherein the open sides thereof are also disposed in opposite directions. The lower set is identical to the upper set, and the recesses of the fingers on a common "side" of the body are aligned in order to receive a common jaw of the trap.

When using the holder with the Conibear trap 10, the jaws 12 and 14, which are parallel, are moved toward each other to "cock" the trap, and in the process of moving the jaws 12 and 14 toward each other the jaws are received within the finger element recesses 40, as will be appreciated from FIG. 1, and the jaws are moved toward each other sufficiently to permit the retainer 22 to be positioned to hold the trap in a set condition. The resilient nature of the finger elements 36 and 38 permits the finger elements to be deflected toward each other during setting of the trap, and this deflection accomodates the holder to the trap configuration, and produces a firm frictional engagement between the recesses 40 of the finger elements and the jaws of the trap.

Preferably, the stake 30 is inserted through the coil 44 of the spring as shown in FIG. 1 anchoring the trap relative to the stake.

The set trap as held in the holder in accord with the invention appears as in FIG. 1, and upon an animal swimming through the trap engaging trigger 24 and releasing the retainer 22, the jaws 12 and 14 rapidly move away from each other and move out of the associated finger recesses 40. Thus, initial trap jaw movement will release the trap from the holder, and the holder in no way interferes with the closing of the trap. After release from the holder the trap will fall to the ground, and the holder structure does not interfere with releasing the game from the trap as the stake will normally be pulled from the ground and from the trap spring coil 44.

Figure 4:
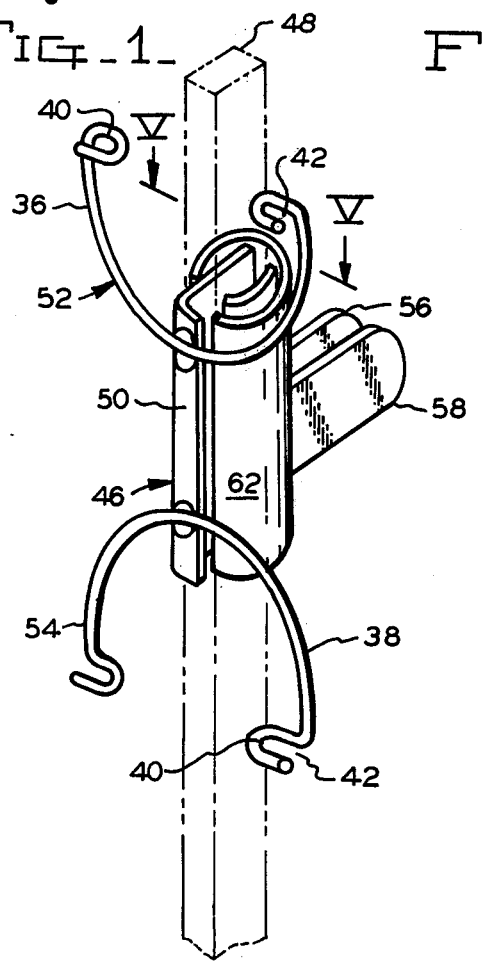
FIG. 4 is a perspective view of an embodiment of animal trap holder in accord with the invention utilizing a resilient clamp for attaching the holder to its stake, the stake being shown in dotted lines.
Figure 5:
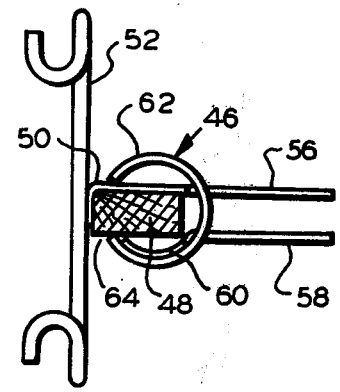
FIG. 5 is a plan sectional view as taken along Section V—V of FIG. 4.

In the embodiment shown in FIGS. 4 and 5 the holder body 46 is in the form of a resilient clip adapted to grip a wooden stake 48. The holder structure includes a member 50 to which the finger sets 52 and 54 are welded or soldered, and the finger sets are of a configuration and operation identical to the embodiment of FIGS. 1-3. The member 50 constitutes a portion of a handle 56, and a second handle 58 includes a portion 60 located within the C configuration resilient spring clip 62 which imposes a biasing closing action on the member 50 and portion 60 in a manner similar to a conventional paper clip. By squeezing on the handles 56 and 58 the member 50 and portion 60 will move away from each other permitting the body 46 to be located upon the stake 48 as desired, and an opening exists at 64 which is sufficient, when the body structure is fully open, to permit the holder to be placed upon the stake by lateral movement, or the stake may be inserted in an endwise movement through the support body.

It will be appreciated that in the described embodiments trap holding structure is shown which meets the objects recited above, and it is appreciated that modifications may be apparent to those skilled in the art without departing from the spirit and scope of the invention.

I claim:

1. In combination, a trap including a pair of spring biased jaws held in spaced relationship when the trap is set and initially moving away from each other upon the trap being released, a holder body, and trap jaw engaging means defined on said body adapted to receive and hold the associated trap jaws for support of the trap, said means supporting the trap when set and releasing the associated jaws when the trap is sprung.

2. In a combination as in claim 1 wherein said trap jaw engaging means comprises a pair of spaced recesses each having a jaw receiving open side, said sides being disposed in opposed directions and away from each other.

3. In a combination as in claim 1 wherein said holder body includes stake receiving means whereby said body may be supported upon a stake.

4. In a combination as in claim 1 wherein said trap jaw engaging means comprises resilient fingers having an inner end affixed to said body and an outer end having a jaw engaging recess defined therein.

5. In a combination as in claim 4 wherein a pair of fingers are mounted upon said body, said fingers outer end recesses being in spaced opposed relationship each having a jaw receiving open side, said sides being disposed in opposite directions away from each other.

6. In a combination as in claim 5 wherein two pair of fingers are mounted upon said body, said pairs being spaced from each other and a recess of each pair being in alignment whereby two finger end recesses are adapted to engage each trap jaw at spaced locations.

7. A holder for animal traps wherein the trap includes a pair of spring biased jaws held in spaced relationship when the trap is set and initially moving away from each other upon the trap being released comprising, in combination, an elongated body, stake mounting means defined on said body, first and second pairs of resilient fingers mounted on said body, and jaw engaging means defined on each finger open in the direction of jaw movement at trap release, a finger of each pair adapted to engage one trap jaw and a finger of each pair adapted to engage the other trap jaw.

8. In a holder for animal traps as in claim 7 wherein said fingers comprise wire elements having free ends and said jaw engaging means comprise recesses defined by said wire elements at said free ends.

9. In a holder for animal traps as in claim 7 wherein said stake mounting means comprises a bore defined in said body adapted to receive a stake, and a set screw threaded upon said body intersecting said bore.

10. In a holder for animal traps as in claim 7 wherein said stake mounting means comprises a resilient clip, said clip including handle means for operating said clip between open and closed conditions.

* * * * *